United States Patent [19]

Boyle, III et al.

[11] Patent Number: 5,944,348
[45] Date of Patent: Aug. 31, 1999

[54] COLLAPSIBLE STEERING COLUMN SUPPORT STRUCTURE

[75] Inventors: Walter J. Boyle, III, Lake Orion; Jeffrey L. Stancavage, Chesterfield Twnshp; Timothy Hsu, Troy, all of Mich.

[73] Assignee: DaimlerChrysler Corporation, Auburn Hills, Mich.

[21] Appl. No.: 08/815,501

[22] Filed: Mar. 11, 1997

[51] Int. Cl.⁶ ........................................ B62D 1/19
[52] U.S. Cl. ................................ 280/777; 74/492
[58] Field of Search ............................ 280/777, 779; 74/492; 248/900

[56] References Cited

U.S. PATENT DOCUMENTS 3,415,140  12/1968  Bien et al. ........................ 280/777
3,621,732  11/1971  Kaniut ............................. 74/492
3,923,319  12/1975  Nonaka et al. ................... 280/777
4,452,096  6/1984  Workman .......................... 280/777

FOREIGN PATENT DOCUMENTS 5-213205  8/1993  Japan ............................. 280/777

*Primary Examiner*—Peter C. English
*Attorney, Agent, or Firm*—Lawrence J. Shurupoff

[57] ABSTRACT

Apparatus for supporting a steering column of an automotive vehicle comprises a bracket having a central channel through which the steering column extends, and flanges extending laterally outwardly from the upper edges of the side walls of the channel. The flanges are rigidly secured to vehicle support structure. Release capsules are secured to the steering column bracket and are slidably engaged in slots in the side walls of the channel to permit stroke of the steering column in a frontal impact of sufficient magnitude.

7 Claims, 3 Drawing Sheets

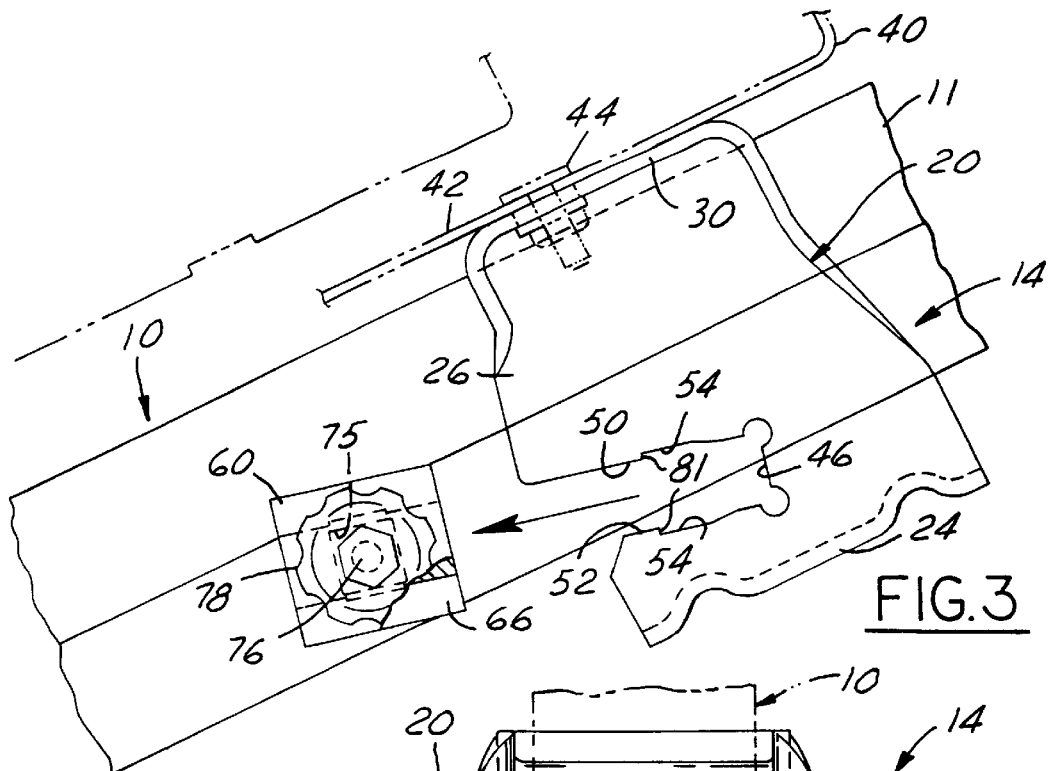
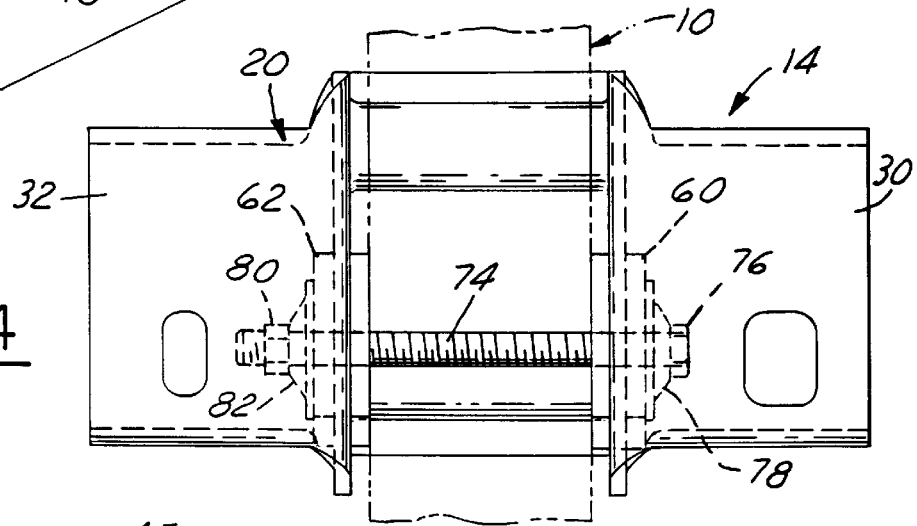
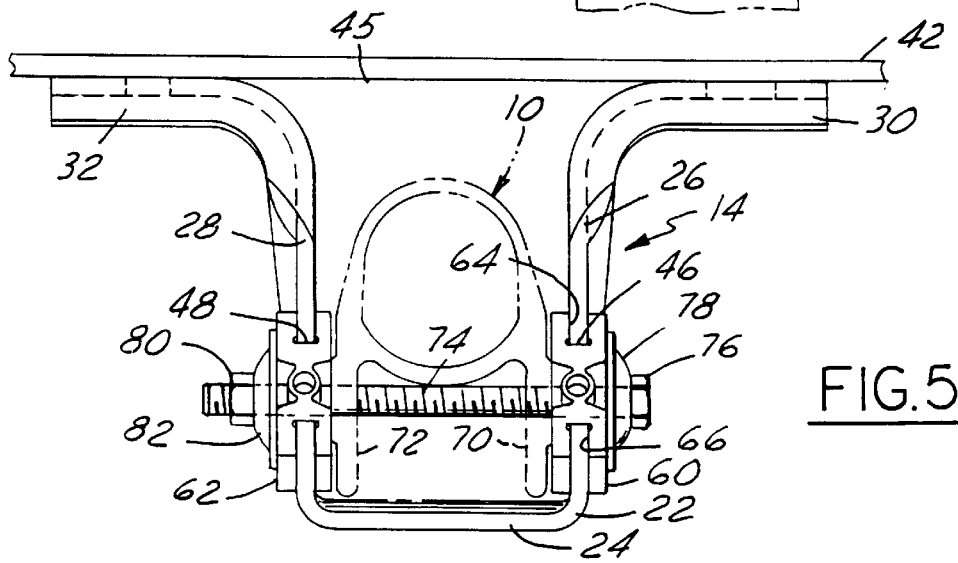

5,944,348

COLLAPSIBLE STEERING COLUMN SUPPORT STRUCTURE

FIELD OF INVENTION

This invention relates to a support assembly for the steering column of an automotive vehicle.

BACKGROUND OF THE INVENTION

A steering column tends to vibrate when the vehicle is in motion. To inhibit vibration, dampeners, in the form of capsules or isolator pads, have sometimes been provided. The isolator pads usually have been formed of a plastic material and have a frictional hold on a mounting bracket rigidly connected to the steering column. More specifically, the bracket has laterally outwardly extending flanges which are frictionally, slidably connected to the isolator pads. The isolator pads are mounted on rigid vehicle support structure. In the event of a frontal impact of sufficient magnitude to cause collapse of the steering column, the steering column will stroke forwardly, and the bracket, being secured to the steering column, will also move in a forward direction. The isolator pads, also referred to as release capsules for their function during frontal impact, separate themselves from the bracket, allowing the column to stroke. One of the disadvantages of this structure is that the bracket flanges extend laterally outwardly from the steering column and often there is not enough space around the steering column to clear the bracket flanges when the steering column strokes. Additionally, the bracket flanges are oriented in a direction that is parallel to the longitudinal axis of the steering column. This angle referred to as steering column angle is often not the optimum angle conducive to column stroking during impact.

SUMMARY OF THE INVENTION

In accordance with the present invention, the bracket is secured, not to the steering column, but rather to the rigid vehicle support structure. The release capsules are secured to the steering column. Then, when the steering column strokes or collapses, there is no need to provide clearance for the brackets because the brackets do not move with the steering column.

More specifically, the bracket has a central channel through which the steering column extends. The release capsules have a sliding, frictional engagement with the channel to provide a support for the steering column, but are releasable in response to longitudinal collapse of the steering column in a frontal impact. Preferably, the steering column has a pair of laterally spaced flanges, and the release capsules are secured to the steering column by a bolt extending transversely of the steering column through the flanges. It is also preferred that the vehicle support structure include a panel surface which extends across the channel and over the top surface of the steering column outer jacket. The panel and channel cooperate in defining a tunnel which surrounds the steering column and guides the motion of the steering column when it strokes.

Preferably, the channel side walls are formed with slots and the release capsules are longitudinally slidable in the slots in the event of a frontal impact. The orientation of the slots with respect to the steering column angle are easily adapted to a particular vehicle to optimize the effort required to stroke the steering column during frontal impact.

One object of this invention is to provide apparatus for supporting a steering column and controlling its stroke in the event of a frontal impact, having the foregoing features and capabilities.

Another object is to provide apparatus of the type described which is composed of a relatively few simple parts, is rugged and durable in use, and can be inexpensively manufactured and assembled.

These and other objects, features and advantages of the invention will become more apparent as the following description proceeds, especially when considered with the accompanying drawings.

BRIEF DESCRIPTION OF THE DRAWINGS

FIG. 3 is a view similar to FIG. 2 but showing the relationship of the parts after collapse or stroking of the steering column following a frontal impact.

FIG. 4 is a top view of the structure shown in FIG. 3, with the steering column shown in broken lines to better illustrate the support structure.

FIG. 5 is a view of the support structure for the steering column as viewed from the front and looking rearwardly, with the steering column shown in broken lines.

DETAILED DESCRIPTION OF THE PREFERRED EMBODIMENT

Figure 1:
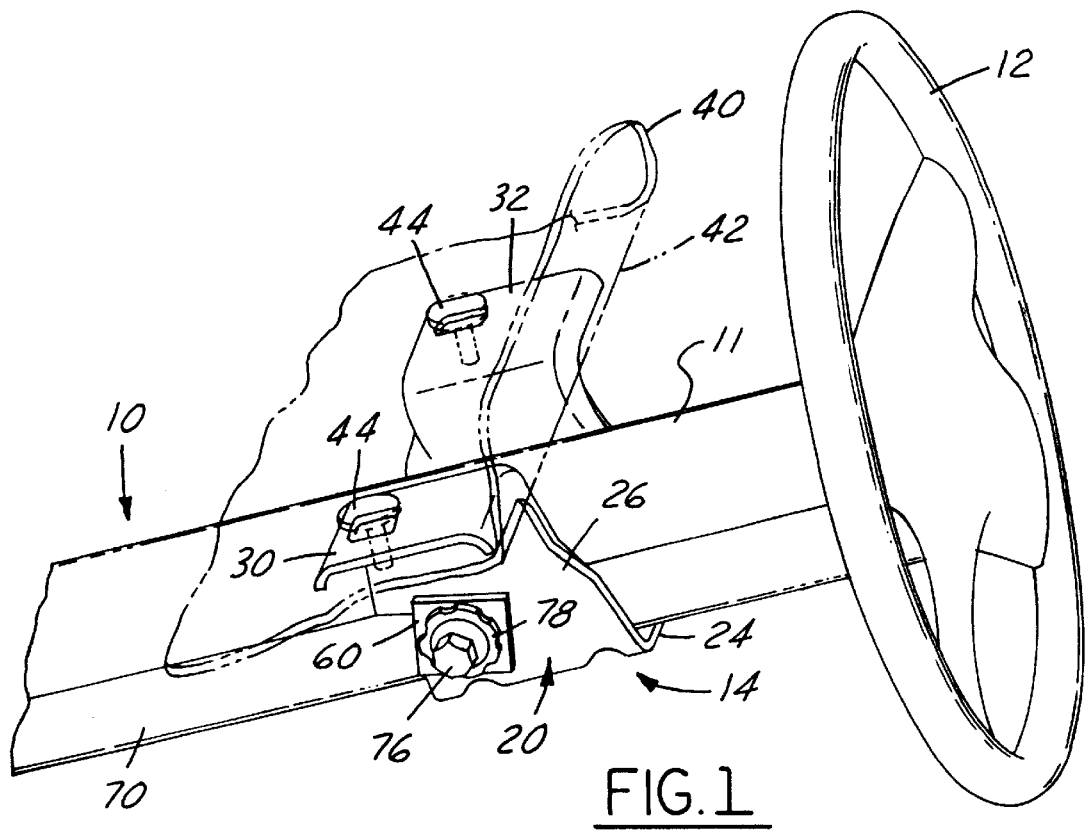
FIG. 1 is a fragmentary perspective view showing a portion of a steering column and support structure, all constructed in accordance with the present invention.
Figure 2:
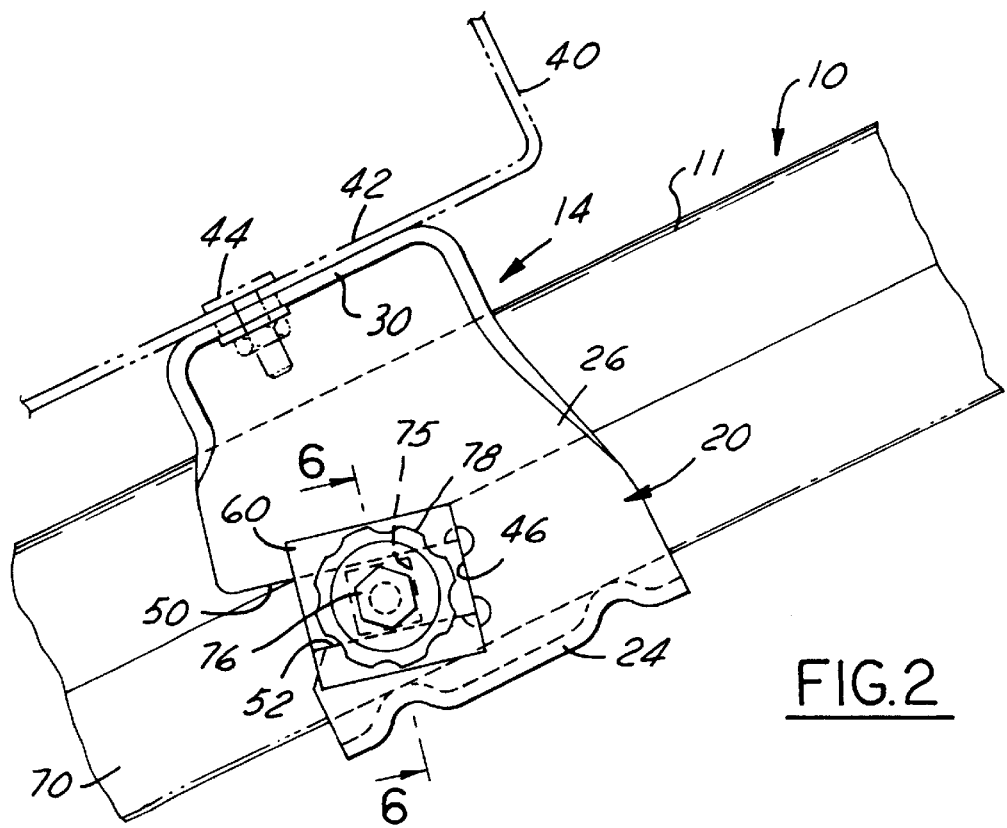
FIG. 2 is a fragmentary side elevational view of a portion of the structure shown in FIG. 1.
Figure 6:
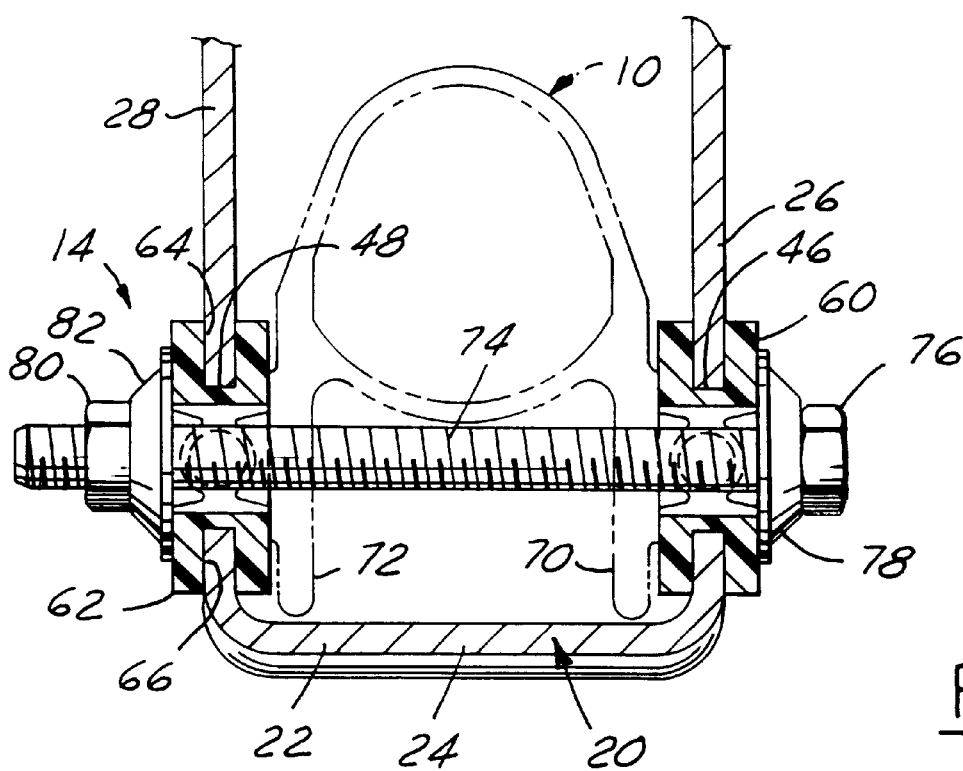
FIG. 6 is a sectional view taken on the line 6—6 in FIG. 2.

An elongated steering column 10 is shown in FIGS. 1 and 2 in its normal position in which it extends longitudinally of the vehicle and is inclined upwardly and rearwardly. The steering column has an elongated steering shaft (not shown) within an elongated tubular jacket 11, with a steering wheel 12 on the upper or rear end of the steering shaft. An upper mounting assembly 14 supports the steering column near its upper end. A lower mounting assembly (not shown) may also be provided to support the steering column adjacent to its lower or front end. A coupler (not shown) at the lower end of the steering column is provided for connecting the steering shaft to a steering gear assembly to steer the front wheels of the vehicle.

The mounting assembly 14 comprises a bracket 20 which extends transversely of the steering column. The bracket 20 has a generally U-shaped, central channel 22 which loops under the steering column. The channel 22 has a bottom wall 24 and laterally spaced, vertical side walls 26 and 28. Parallel flanges 30 and 32 project laterally outwardly from the upper edges of the side walls 26 and 28. Rigid vehicle support structure 40 includes a flat panel surface 42 directly above the steering column to which the bracket flanges 30 and 32 are secured by nut and bolt assemblies 44. The flat panel surface 42 cooperates with the central channel 22 of the bracket 20 in defining a tunnel 45 through which the steering column extends.

The side walls 26 and 28 of the channel have parallel, elongated slots 46 and 48 which are closed at the rear ends and open at the front ends. The opposite side edges 50 and 52 of each slot are generally parallel to one another, but formed with recesses 54 for a purpose which will become more apparent from the following description.

Release capsules 60 and 62 are provided to secure the steering column. The release capsules are made of any suitable stiff material and may be made of a suitable plastic such as nylon. The release capsules are generally square and flat and have parallel grooves 64 and 66 in the opposite side edges which receive the material of the channel side walls 26 and 28 on opposite sides of the slots therein. This provides a frictional, slidable connection between the release capsules 60 and 62 and the channel side walls 26 and 28.

Extending downwardly from the jacket 11 of the steering column are a pair of elongated, laterally spaced, longitudinally extending, parallel flanges 70 and 72. The release capsules 60 and 62 are secured to the flanges 70 and 72 by a bolt 74 which extends transversely across the steering column through openings in the flanges 70 and 72 and through openings 75 in the release capsules. A head 76 on one end of the bolt presses a washer 78 against the outer surface of one of the release capsules and a nut 80 threaded on the other end of the bolt presses a washer 82 against the outer surface of the other release capsule.

The release capsules 60 and 62 may be assembled into the slots 46 and 48 in the side walls of the bracket channel 22 by pressing them into the front ends of the slots with the opposite side edges 50 and 52 of the slots engaging the grooves 64 and 66 in the release capsules. The distance between the side edges 50 and 52 of the slots 46 and 48 approximates the distance between the bottoms of the grooves 64 and 66 in the release capsules. This provides a tight frictional engagement and secures the steering column during normal operation of the vehicle. The recesses 54 in the side edges 50 and 52 of the slots form ridges 81 which bite into the release capsules and provide a means of locking the release capsules in the slots but with a yielding action permitting the release capsules to slip out of the slots when a frontal impact of sufficient magnitude occurs and causes stroke of the steering column.

The steering column is shown inclined at an acute angle to the horizontal in FIG. 2, normally at an angle of about 26°. The angle of the slots 46 and 48 in the side walls of the bracket channel 22 is also inclined at an acute angle to the horizontal, but this angle is preferably less than the angle of the steering column. The angle of the slots to the horizontal may vary and in the present instance is on the order of about 12°. The 12° angle is considered the angle at which the force of the driver will engage the steering wheel in a collision or frontal impact. This angle can be varied as desired, but the angle is usually somewhat flatter or more horizontal than the angle of the steering column.

What is claimed is:

1. Apparatus for supporting an elongated steering column of an automotive vehicle, the steering column having a tubular jacket, comprising
   rigid support structure,
   a bracket secured to the support structure,
   first and second release capsules, and
   means securing said release capsules to the jacket of the steering column on opposite sides thereof,
   said release capsules having frictional sliding engagement with said bracket to provide support for the steering column but being releasable in response to longitudinal stroke of the steering column in a frontal impact,
   the jacket of said steering column having laterally spaced, depending flanges, and said means securing said release capsules to the jacket of the steering column includes a bolt extending transversely of the steering column through and secured to said flanges.

2. Apparatus for supporting an elongated steering column of an automotive vehicle, the steering column having a tubular jacket, comprising
   rigid support structure above the steering column,
   a bracket including a channel having laterally spaced-apart side walls and a bottom wall, with the side walls having upper edges,
   first and second flanges at opposite sides of the steering column beneath said support structure extending laterally outwardly from the upper edges of the side walls of the channel,
   means rigidly securing said flanges to the support structure,
   said steering column extending through the channel with the bottom wall thereof beneath and the side walls on opposite sides of the steering column,
   first and second release capsules,
   means securing said release capsules to the jacket of the steering column, and
   means providing a sliding, frictional engagement of said release capsules and the respective channel side walls to provide support for the steering column but being releasable in response to longitudinal collapse of the steering column in a frontal impact,
   the jacket of said steering column having laterally spaced jacket flanges, and said means securing said release capsules to the jacket of the steering column including a bolt extending transversely of the steering column through and secured to the jacket flanges.

3. Apparatus as defined in claim 2, wherein said support structure comprises a panel surface above said first and second flanges extending across said channel, said panel surface and said channel cooperating to define a tunnel surrounding said steering column and guiding the stroking of the steering column during frontal impact of a vehicle.

4. Apparatus as defined in claim 2, wherein the means providing a sliding, frictional engagement of said release capsules and the respective channel side walls includes parallel elongated slots in said side walls slidably receiving said release capsules, said release capsules being longitudinally slidable in said slots in a frontal impact.

5. Apparatus as defined in claim 4, wherein the steering column is inclined upwardly and rearwardly at a first acute angle to the horizontal, and said slots are inclined upwardly and rearwardly at a second acute angle to the horizontal less than said first acute angle.

6. Apparatus as defined in claim 5, wherein said first acute angle is on the order of about 26° and said second acute angle is on the order of about 12°.

7. Apparatus as defined in claim 6, wherein each of said slots has an open end to permit endwise insertion of said release capsules into said slots, each of said slots having opposite side edges formed with locking recesses to retain the release capsules after they are inserted, said recesses adapted to release the release capsules in a frontal impact of sufficient magnitude to cause the steering column to stroke.

* * * * *